United States Patent
Kang (10) Patent No.: US 11,703,122 B2
(45) Date of Patent: Jul. 18, 2023

(54) MOTOR STICKING DIAGNOSIS AND REPAIR METHOD AND DEVICE IN SHIFT-BY-WIRE SYSTEM

(71) Applicant: HYUNDAI KEFICO CORPORATION, Gyeonggi-do (KR)

(72) Inventor: Ji-Hyeok Kang, Gyeonggi-do (KR)

(73) Assignee: Hyundai Kefico Corporation, Gyeonggi-Do (KR)

( * ) Notice: Subject to any disclaimer, the term of this patent is extended or adjusted under 35 U.S.C. 154(b) by 0 days.

(21) Appl. No.: 17/719,730

(22) Filed: Apr. 13, 2022

(65) Prior Publication Data

US 2022/0333684 A1    Oct. 20, 2022

(30) Foreign Application Priority Data

Apr. 15, 2021 (KR) .................. 10-2021-0049337

(51) Int. Cl.
*F16H 61/12* (2010.01)
*F16H 61/32* (2006.01)

(52) U.S. Cl.
CPC ............. *F16H 61/12* (2013.01); *F16H 61/32* (2013.01); *F16H 2061/1216* (2013.01); *F16H 2061/1228* (2013.01); *F16H 2061/1288* (2013.01); *F16H 2061/326* (2013.01)

(58) Field of Classification Search
CPC .. F16H 61/12; F16H 61/32; F16H 2061/1216; F16H 2061/1228; F16H 2061/1288; F16H 2061/326
See application file for complete search history.

(56) References Cited

U.S. PATENT DOCUMENTS

| 10,598,279 B2* | 3/2020 | Choi ..................... H02P 25/08 |
| 2008/0234105 A1* | 9/2008 | Sakamoto ............... F16H 61/12 477/124 |
| 2014/0188332 A1* | 7/2014 | Wittmaak, Jr. .... G05B 23/0256 701/33.1 |

FOREIGN PATENT DOCUMENTS

| JP | 2010-192998 | 8/2010 |
| JP | 2016-035218 | 2/2016 |
| KR | 2015-0062167 A | 6/2015 |
| KR | 10-2019-0067404 A1 | 6/2019 |
| KR | 10-2019-0135214 A1 | 12/2019 |

* cited by examiner

*Primary Examiner* — Edwin A Young
(74) *Attorney, Agent, or Firm* — Fox Rothschild LLP (57) ABSTRACT

A motor sticking diagnosis and repair method includes the steps of, when an operation of a shift lever is detected, determining whether a current position matches a target position, when the current position does not match the target position, rotating the motor toward the target position, determining once again whether the current position matches the target position after rotation of the motor, when the current position does not match the target position, diagnosing whether the motor sticking has occurred, when the motor is diagnosed as being stuck, allowing the motor to switch to a free-rotation mode by temporarily blocking the current being applied to the motor upon sticking diagnosis, and selecting either a first repair strategy or a second repair strategy depending on whether the position of the motor changes after switching to the free-rotation mode.

17 Claims, 5 Drawing Sheets

MOTOR STICKING DIAGNOSIS AND REPAIR METHOD AND DEVICE IN SHIFT-BY-WIRE SYSTEM

CROSS REFERENCE TO RELATED APPLICATION

The present application claims priority to Korean Patent Application No. 10-2021-0049337, filed on Apr. 15, 2021, the entire contents of which are incorporated herein for all purposes by this reference.

FIELD

The present disclosure relates to a method of diagnosing and repairing a motor sticking phenomenon occurring in a Shift-By-Wire system (SBW) and, more particularly, to a motor sticking diagnosis and repair method and device which diagnoses a motor sticking state from a change in the motor position and current during a shift range change in a Shift-By-Wire system and at the time of diagnosing the motor sticking, repairs or overcomes the motor sticking through the control of increasing a motor duty value.

BACKGROUND

In the Shift-By-Cable (SBC) method, which is a shift range switching method of a conventional automatic transmission, when a shift lever is shifted, a detent plate rotates by a cable so that a manual valve moves to open P, R, N, and D flow paths on a valve body, thereby switching to the desired shift range. However, since the conventional SBC method requires to consider the location and arrangement of cables, the method has large design restrictions and disadvantages in terms of assembly and mass production.

A method to replace the conventional SBC method is a Shift-By-Wire (SBW) method. The SBW method is a technology that provides convenience in manipulation and improves safety by rotating a detent plate with a motor instead of a cable connected to a shift lever on the driver's seat. This method is configured to detect the operation condition of the shift lever with a sensor or a switch, and rotate the detent plate with a motor to operate a manual valve.

In such a SBW method, the detent plate is provided with a plurality of shift ranges in which a detent roller can be statically stabilized by a detent spring. The motor rotates the detent plate to an appropriate position in response to the driver's request for shift range change according to the driver's manipulation of the shift lever to lock the specific mechanical state of a vehicle system, thereby creating the driver's desired state such as parking, driving, etc.

The motor operates under the control of a controller (SBW controller) upon the reception of a request for a shift range change by operating the shift lever. When a user's request for a shift range change is received during driving, the controller calculates the duty that can be accurately converted to the requested specific shift range on the basis of a signal received from a motor Hall sensor and a shift lever sensor, and controls the motor according to the calculated duty.

Here, in a driver including a motor (a detent plate that is synchronized with the motor and rotates in a forward/reverse direction in a predetermined angular range, a detent roller that constrains the detent plate to a predetermined shift range, and a rotary shaft that mechanically connects the detent plate and the motor, etc.), a motor sticking situation in which the motor is mechanically constrained and cannot be driven for the reason of an inflow of foreign substances or increased friction between peripheral devices due to aging.

For example, when a foreign substance sticks to a portion at a specific position on the path (a surface that defines the shift range with a surface formed in a curved wave form continuous on the outer periphery of the detent plate) along which the detent roller rolls in close contact with the detent spring, a motor sticking failure occurs. In this case, the amount of current applied to the motor gradually increases, which may result in damage to the motor due to overcurrent or a situation in which a shift change cannot be performed.

Therefore, there is a need for a method capable of accurately diagnosing and overcoming or repairing the motor sticking in the conventional Shift-By-Wire system.

The foregoing is intended merely to aid in the understanding of the background of the present disclosure, and is not intended to mean that the present disclosure falls within the purview of the related art that is already known to those skilled in the art.

SUMMARY

In one aspect, a motor sticking diagnosis and repair method and device is provided which can diagnose a motor sticking state from a change in the motor position and current during a shift range change according to a driver's request in a Shift-By-Wire system and at the time of diagnosing the motor sticking, repairs or overcomes the motor sticking through the control of increasing a motor duty value.

In one aspect, there is provided a method of diagnosing and repairing motor sticking in a Shift-By-Wire (SBW) system in which a shift range change of an automatic transmission is implemented by a motor, the method including:

(a) when an operation of a shift lever is detected, determining whether or not a current position of the motor matches a target position;

(b) when the current position does not match the target position, rotating the motor in a direction of the target position;

(c) determining once again whether or not the current position of the motor matches the target position after rotation of the motor;

(d) when it is determined in step (c) that the current position does not match the target position, diagnosing whether or not the motor sticking has occurred;

(e) when the motor is diagnosed as being stuck, allowing the motor to switch to a free-rotation mode in which the motor is freely rotatable by temporarily blocking the current being applied to the motor at the time of diagnosis; and (f) selecting either a first repair strategy or a second repair strategy depending on whether or not the position of the motor changes after switching to the free-rotation mode to repair the motor sticking.

As a result of the determination through steps (a) and (c), when the current position and the target position match each other, it can be recognized that the shift range has been changed normally, and the process may be terminated in the corresponding step without further progress.

In addition, in step (d), when there is no change in the output of a position sensor for detecting the rotation direction and rotation angle of the motor, it is possible to diagnose the motor as being stuck.

More preferably, in step (d), when there is no change in the output of the position sensor for detecting the rotation direction and rotation angle of the motor, and the output of a current sensor for detecting the strength of the current applied to the motor exceeds a predetermined limit value for a predetermined time, it is possible to diagnose the motor as being stuck.

In addition, in step (f), when there is no change in the motor position after switching to the free-rotation mode, the first repair strategy may be selected, and when a change in the motor position is detected after switching to the free-rotation mode, the second repair strategy may be selected.

The first repair strategy may be a strategy that firstly drives the motor opposite to the direction of the target position to position the motor in a valley portion of the adjacent shift ranges, and after adjusting a duty value to increase by a predetermined increment, secondly drives the motor in the direction of the target position with the increased duty value to repair the motor sticking. In addition, the second repair strategy may be a strategy that after adjusting a duty value to increase by a predetermined increment, drives the motor in the direction of the target position with the increased duty value to repair the motor sticking.

The motor sticking diagnosis and repair method may further include:

(g) determining whether or not the motor sticking has been repaired through the first or second repair strategy; and (h) as a result of the determination through step (g), when the motor sticking is not repaired, checking the duty value, and as a result of checking through step (h), when the duty value is less than a predetermined maximum value, the process return to step (e), and the subsequent steps repeat such that after the duty value is further increased by the predetermined increment, the first repair strategy or the second repair strategy may be applied again.

Preferably, in step (g), it is possible to determine whether or not the motor sticking has been repaired by comparing a distance between the current motor position and the motor position at the time when the sticking is diagnosed on the basis of the target position.

More specifically, when the absolute value of the difference between the target position and the current position is smaller than the absolute value of the difference between the target position and the sticking position (the position of the motor at the time when the sticking is diagnosed), (|target position−current position|<|Target position−Sticking position|), it is possible to determine that the motor sticking is repaired.

As a result of checking through step (h), when the duty value reaches the predetermined maximum value, it is determined as a situation in which the motor sticking cannot be repaired, and a relevant warning message may be output through a driver recognizable means.

In another aspect, there is provided a device for diagnosing and repairing motor sticking in a Shift-By-Wire (SBW) system in which a shift range change of an automatic transmission is implemented by a motor, the device including:

a motor generating a driving force for rotating a detent plate to a target position;

a Hall sensor and a current sensor provided to specify a position of a rotor inside of the motor and an intensity of a current applied to the motor, respectively;

a position sensor provided to detect a signal change according to the rotation of the motor and output a PWM signal corresponding to a current shift range; and a Shift-By-Wire (SBW) controller configured to analyze a signal from a shift lever sensor detecting a change in a position of a shift lever to set a target position, and control the driving of the motor on the basis of signals of the Hall sensor and the position sensor to rotate the detent plate toward the set target position, the SBW controller configured to diagnose whether or not the motor sticking has occurred from the signals of the position sensor and the current sensor, and when the motor sticking is diagnosed, to apply different repair strategies depending on a position of the motor being stuck to repair the motor sticking.

Preferably, the SBW controller may include: a data collection section operated to receive signals from the shift lever sensor and the position sensor, and determine whether or not the current position of the motor matches the target position on the basis of the received signals; a motor sticking-determination section operated to receive signals from the current sensor and the position sensor and diagnose whether or not the motor sticking has occurred on the basis of the received signals; a motor operation mode-setting section operated to, when the motor is diagnosed in the motor sticking-determination section as being stuck, select different control modes depending on a position of the motor being stuck to repair the motor sticking; and a duty application section operated to apply a duty set depending on the control mode selected by the motor operation mode-setting section to the motor.

Preferably, when there is no change in the output of the position sensor for detecting the rotation direction and rotation angle of the motor, the motor sticking-determination section may diagnose the motor as being stuck.

More preferably, when there is no change in the output of the position sensor for detecting the rotation direction and rotation angle of the motor, and the output of the current sensor for detecting the strength of the current applied to the motor exceeds a predetermined limit value for a predetermined time, the motor sticking-determination section may diagnose the motor as being stuck.

In addition, the motor operation mode selected by the motor operation mode-setting section may include: a free-rotation mode that secures a time and a distance to obtain a torque required to repair the motor sticking; a reverse rotation mode that when it is impossible to secure the time and distance to obtain the required torque through the free-rotation mode depending on the position of the motor being stuck, drives the motor in the reverse direction (the opposite direction to the target position direction) to secure the time and distance; and a target duty increase mode that gradually increases a target duty in proportion to the re-attempt times of the free-rotation mode or the reverse rotation mode.

Preferably, the motor operation mode-setting section may select a repair strategy that switches to the free-rotation mode so that the motor is freely rotatable by temporarily blocking the current being applied to the motor at the time of diagnosis of the sticking, and depending on whether or not the motor position changes after switching to the free-rotation mode, switches directly to the target duty increase mode or switches to the target duty increase mode via the reverse rotation mode.

More preferably, when there is no change in the motor position after switching to the free-rotation mode, a repair strategy of switching to the target duty increase mode via the reverse rotation mode may be selected, and when there is a change in the motor position after switching to the free-rotation mode, a repair strategy of switching directly to the target duty increase mode may be selected.

In addition, the SBW controller may determine whether or not the motor sticking has been repaired by comparing a distance between the current motor position and the motor position at the time when the sticking is diagnosed with respect to the target position on the basis of the output of the position sensor.

One or more the above steps may be carried out through use of a processor or control unit.

More specifically, when the absolute value of the difference between the target position and the current position is smaller than the absolute value of the difference between the target position and the sticking position (the position of the motor at the time when the sticking is diagnosed), (|target position−current position|<|Target position−Sticking position|), it is possible to determine that the motor sticking is repaired.

According to the embodiments o discussed above, by applying the free-rotation mode, it is possible to accurately determine the type of sticking (whether motor sticking occurred during movement from valley to mountain direction or movement from mountain to valley direction with reference to a position of a roller on a positioning surface of a detent plate), and selectively apply an appropriate strategy depending on the sticking type.

In other words, there is an advantage in that the sticking can be repaired by the sticking repair strategy through an efficient motor movement, and the duty value is gradually increased in proportion to the attempt times to repair the sticking, so when the degree of sticking is not severe, the sticking problem can be solved even in a low duty region before the maximum duty (100%) is applied, and thus unnecessary power consumption in the process of repairing the sticking can be reduced.

Other aspects are disclosed infra.

DETAILED DESCRIPTION

Hereinafter, preferred embodiments of the present disclosure will be described in detail with reference to the accompanying drawings.

Terms used herein are used to merely describe specific embodiments, and are not intended to limit the present disclosure. As used herein, an element expressed as a singular form includes a plurality of elements, unless the context clearly indicates otherwise.

Further, it will be understood that the term "comprising" or "including" specifies the presence of a stated feature, number, step, operation, element, part, or combination thereof, but does not preclude the presence or addition of one or more other features, numbers, steps, operations, elements, parts, or combinations thereof.

Also, terms such as first, second, etc. may be used to describe various elements, but the elements should not be limited by the terms. The above terms are used only for the purpose of distinguishing one component from another.

In addition, terms such as " . . . part", " . . . unit", " . . . module", etc. described in the specification mean a unit that processes at least one function or operation, which may be implemented by hardware or software or a combination of hardware and software.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example, both gasoline-powered and electric-powered vehicles.

In the description with referenced to the accompanying drawings, it is noted that like elements are denoted in the drawings by like reference symbols, and a repeated description for the same configuration will be omitted. Further, the detailed description of known functions and configurations that may obscure the gist of the present disclosure will be omitted.

First, a mechanical configuration of a shift range switching mechanism of a Shift-By-Wire (SBW) system will be schematically illustrated with reference to FIG. 1.

Figure 1:
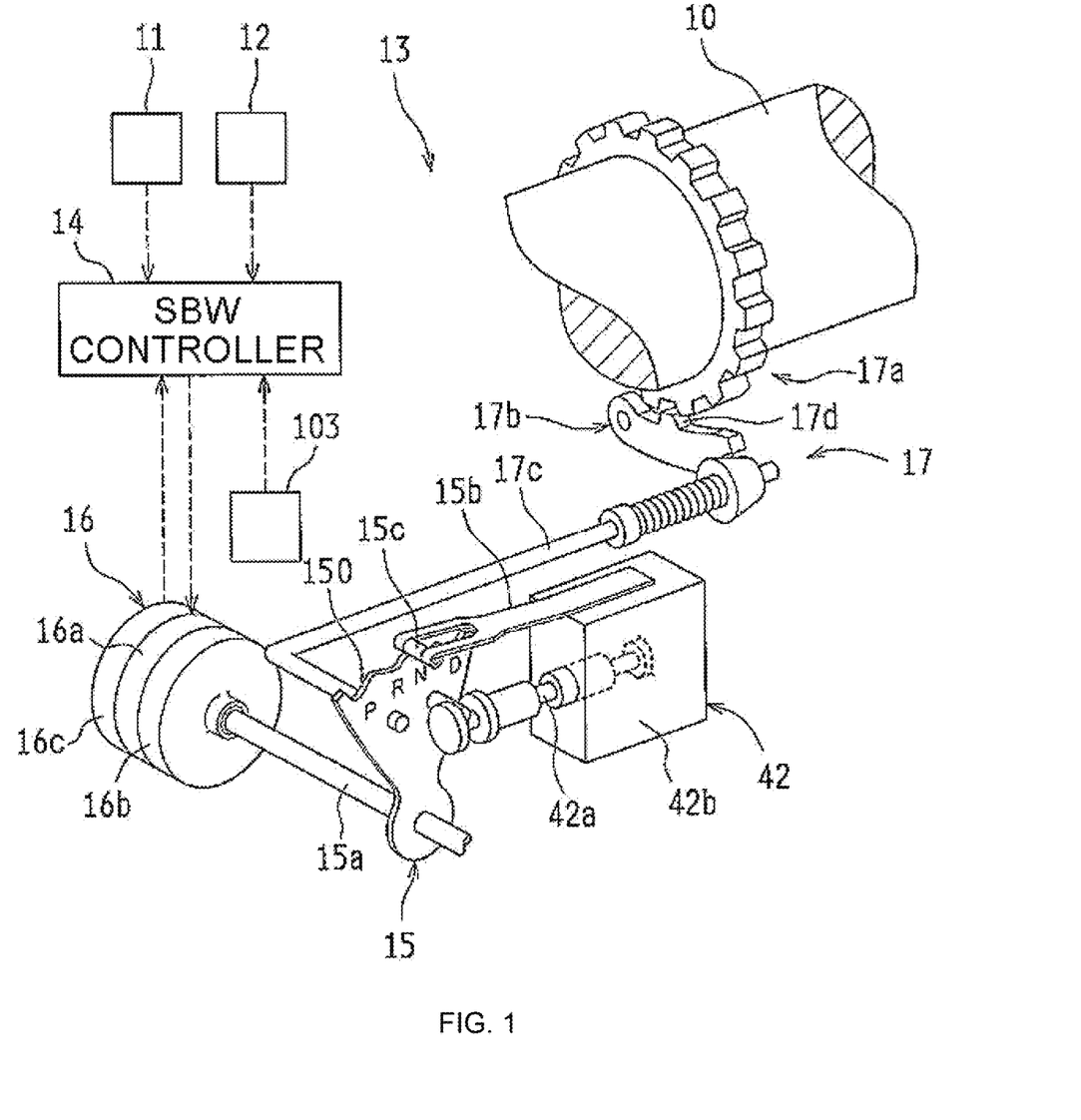
FIG. 1 is a perspective view illustrating a range switching mechanism of a Shift-By-Wire (SBW) system applied to an automatic transmission.

FIG. 1 is a perspective view illustrating a range switching mechanism of a Shift-By-Wire system applied to an automatic transmission.

Referring to FIG. 1, a shift range switching mechanism 13 includes a detent plate 15 that is interlocked to determine a position of the spool 42*a* of a manual valve 42, and a shift actuator 16 for generating a driving force for rotating the detent plate 15. The shift actuator 16 may be of an electric type, and is activated with power from a battery mounted on a vehicle in the same way as a starter motor (not shown).

The shift range switching mechanism 13 is connected to a parking mechanism 17 in an interlocked manner. The detent plate 15 of the shift range switching mechanism 13 is rotated by the shift actuator 16 to push and pull the spool 42*a* of the manual valve 42 or a parking rod 17*c* of the parking mechanism 17 in stages to determine a position thereof. Here, a detent mechanism is composed of the detent plate 15, a rotation shaft 15*a*, and the detent spring 15*b*.

The detent spring 15*b* may be supported on a valve body 42*b* of the manual valve 42, and the detent plate 15 may be formed in a substantially fan shape. The portion serving as the rotational center of the detent plate 15 is mechanically connected to the shift actuator 16 via the rotation shaft 15a, and thus the detent plate 15 rotates in a synchronized manner with a motor 16a of the shift actuator 16.

A shift range determining surface (hereinafter, referred to as a 'position determining surface') forming a continuous curved waveform is formed on the outer periphery of the detent plate 15. A roller 15c of the detent spring 15b is sandwiched in a valley at a specific position of the positioning surface to maintain the positioned state (the shift range changed state).

Preferably, four valleys may be formed in the positioning surface corresponding to respective range positions (P, R, N, D) of the manual valve 42 that are interlocked. In addition, mountains are formed between respective valleys and neighboring valleys, for example, between a P-range valley and an R-range valley or between an R-range valley and an N-range valley. In this case, the mountains mean boundaries between adjacent shift ranges.

Since pitches between valleys that determine positions of respective shift ranges and neighboring valleys are the same, pitches between the mountains serving as boundaries between adjacent shift ranges and neighboring mountains are also the same. Of course, in some cases, the pitch between the P-range valley and the R-range valley is made larger than the pitches between other valleys, so the pitches between all the valleys are not essentially the same.

When a driver operates the shift lever 11, the shift actuator 16 is driven, and accordingly, a roller 15c of the detent spring 15b is positioned in any one of the four valleys (the valleys that determine the positions for each P, R, N, D range). Thus, the detent plate 15 is maintained in a state of being positioned at positions corresponding to respective positions of the manual valve 42.

The shift actuator 16 may include an electric motor 16a (hereinafter referred to as a 'motor' for convenience of description), a reduction mechanism 16b for decelerating the rotation of the motor, and a position sensor 16c that detects the rotation direction and rotation angle according to the rotation of the motor 16a and outputs a corresponding electric signal to a SBW controller 14 to be described later.

The rotary shaft 15a may be integrally rotatably connected to an output shaft (not shown) of the reduction mechanism 16b by splines or the like, and the parking mechanism 17 serves to switch an output shaft 10 of an automatic transmission 1 to a non-rotatable locked state or a rotatable unlocked state. In this case, the parking mechanism 17 may include a parking gear 17a on the outer surface of the output shaft 10, a parking lock pawl 17b, a parking rod 17c, and the like.

A basic operation of the shift range switching mechanism 13 configured as described above will now be briefly described.

When a vehicle driver manipulates the shift lever 11 or the parking switch 12, one range of parking range (P), reverse range (R), neutral range (N), and drive range (D) of the automatic transmission 1 is selected. As a result, a signal is output from the shift lever sensor 103 or the parking switch 12, and the SBW controller 14 receives the output signal and recognizes the selected target position (or target range, P, R, N, D).

The SBW controller 14 determines a command value (a duty value as a control value including the rotation direction and rotation angle) of the shift actuator 16 on the basis of information on a distance between the current position and the newly recognized target position (P, R, N, D), and rotates the motor 16a in a forward or reverse direction at a predetermined angle at a timing set based on the determined command value. Accordingly, the rotation shaft 15a and the detent plate 15 are rotated at a predetermined angle.

Here, the timing is determined by a Hall sensor 16d using a hall element installed inside of the motor and having a current magnetic effect, and the position sensor 16c detects a signal change according to the rotation of the motor 16a and provides a PWM signal corresponding to the current shift range to the SBW controller 14. In addition, the SBW controller 14 feedback-controls the motor 16a on the basis of signals from the position sensor 16c and the Hall sensor 16d.

For example, when the shift lever 11 is manipulated from the neutral range N to the drive range D, the target position signal is changed from N to D. Upon receiving this signal, the SBW controller 14 sets a target rotation angle corresponding to the selected target position D, determines a command value (duty value) corresponding thereto, and permits energization of the motor 16a according to the determined command value.

When the motor 16a is driven through the energization so that the output shaft thereof rotates, the SBW controller 14 also receives a signal corresponding to the rotation angle from the position sensor 16c in real time. Then, the SBW controller recognizes the rotation angle and direction of the motor 16a in real time from the received signal of the position sensor 16c to feedback-control the motor 16a so that the rotation angle of the motor 16a matches the target rotation angle.

According to this control, as the detent plate 15 rotates counterclockwise in the drawing at a predetermined angle, the roller 15c of the detent spring 15b comes out of the valley of "N" and then gets caught in the valley of "D" on the adjacent side over one adjacent mountain. As a result, the spool 42a of the manual valve 42 slides in the axial direction, and the range of the manual valve 42 switches from N to D.

When the driver manually manipulates the parking switch 12 so that the parking range P is selected, a parking rod 17c is pushed according to the rotation of the detent plate 15, and a parking lock pole 17b is lifted so that a claw thereof 17d is interposed between the teeth of a parking gear 17a. As a result, the output shaft 10 of the automatic transmission 1 is restrained and the manual valve 42 is stopped at the "P" position at the same time.

As previously mentioned in the BACKGROUND of field, the shift range switching mechanism 13 operated in this way may be exposed to a situation in which the motor is mechanically constrained and cannot be driven due to an inflow of foreign substances into the mechanism, increased friction between peripheral devices due to aging, or the like. When a motor sticking failure occurs, the amount of current applied to the motor gradually increases, resulting in damage to the motor due to overcurrent or a situation in which shifting cannot be performed.

A motor sticking diagnosis and repair device in a Shift-By-Wire system according to an embodiment of the present disclosure is configured to accurately diagnose a motor sticking state from a change in the motor position and current during a shift range change according to a driver's request and, at the time of diagnosing the motor sticking, to repair or overcome the motor sticking through the control of increasing a motor duty value.

Hereinafter, a motor sticking diagnosis and repair device according to an embodiment of the present disclosure applied to a Shift-By-Wire (SBW) system including the aforementioned shift range switching mechanism will be described.

Figure 2:
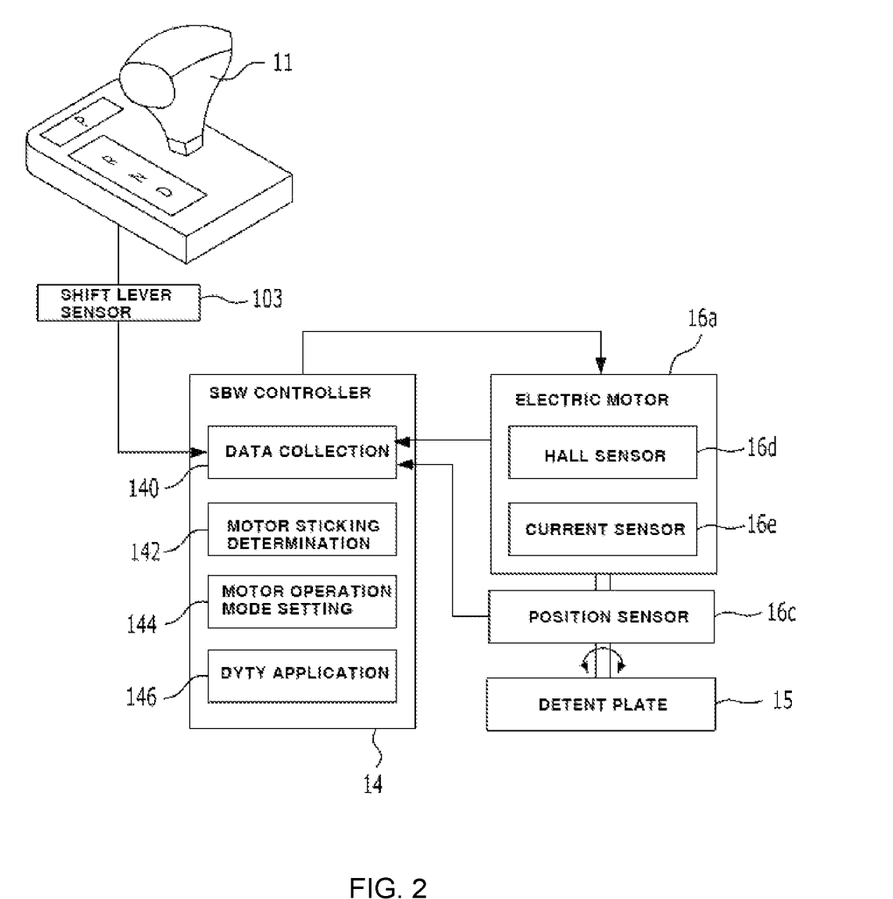
FIG. 2 is a block diagram schematically illustrating the configuration of a motor sticking diagnosis and repair device in a SBW system according to an embodiment of the present disclosure.

FIG. 2 is a block diagram schematically illustrating the configuration of a motor sticking diagnosis and repair device in a SBW system according to an embodiment of the present disclosure.

Referring to FIG. 2, the motor sticking diagnosis and repair device according to an embodiment of the present disclosure includes the aforementioned motor 16a, sensors (a Hall sensor, a position sensor, and a current sensor), and a SBW controller 14. The motor 16a rotates the detent plate 15 to a target position under the control of the SBW controller 14, and the SBW controller 14 recognizes the current position of the detent plate 15 and whether or not the detent plate enters the target position, from signals from the sensors 16c, 16d, and 16e.

As mentioned above, when the shift lever 11 is manipulated, the SBW controller 14 analyzes a signal output from the shift lever sensor 103 and sets a target position. Then, the SBW controller controls the motor 16a so that the detent plate 15 is rotated toward the set target position. More specifically, the SBW controller recognizes the rotation angle of the motor 16a from the signal of the position sensor 16c and then feedback-controls the motor 16a so that the rotation angle coincides with the target rotation angle.

In the present disclosure, the SBW controller 14 diagnoses whether or not the motor is stuck from signals from the position sensor 16c and the current sensor 16e during shift range change in response to a driver's request for shift range change (shift lever operation). Then, when the motor sticking is diagnosed, different repair strategies are applied to repair the sticking according to the sticking position (sticking position with respect to the detent plate).

More specifically, the SBW controller 14 includes a plurality of processors programmed to apply different repair strategies depending on positions where the roller 15c of the detent spring 15b described above is stopped with various types of motor sticking, among a plurality of mountains and valleys (convex portions and concave portions) formed in the detent plate 15 to partition a plurality of shift ranges, thereby repairing the motor sticking.

Preferably, the processors include: a data collection section 140 operated to receive signals from the shift lever sensor 103 and the position sensor 16c, and determine whether or not the current position of the motor matches the target position on the basis of the received signals; and a motor sticking-determination section 142 operated to receive signals from the current sensor 16e and the position sensor 16c and diagnose whether or not the motor sticking occurs on the basis of the received signals.

In addition, the processors includes: a motor operation mode-setting section 144 operated to set the operation mode of the motor 16a depending on the diagnosis result from the motor sticking-determination section 142 such that different control modes are selected depending on a position of the motor when diagnosed as being stuck so as to repair the motor sticking; and a duty application section 146 operated to apply a duty set depending on the control mode selected by the motor operation mode-setting section 144 to the motor.

Preferably, when there is no change in the output of the position sensor 16c for detecting the rotation direction and rotation angle of the motor 16a in a state in which the current position and the target position of the motor match each other, the motor sticking-determination section 142 may diagnose the motor as being stuck. In some cases, in addition to the above condition, even when the output of the current sensor 16e for detecting the strength of the current applied to the motor exceeds a predetermined limit value for a predetermined time, the motor sticking-determination section may also diagnose the motor as being stuck.

In other words, nevertheless a command for switching the shift range to the target position determined according to the operation of the shift lever 11 is given, when the motor does not rotate as much as the setpoint (a state that does not reach the target position) and stops (the state in which the is no change in the output of the position sensor 16c), the motor sticking-determination section may diagnose the motor as being stuck, and when the current condition is added to the above condition, the reliability of diagnosis can be improved.

When motor sticking occurs in a state in which the motor 16a does not reach the target position, the current to rotate the motor to the target position is continuously applied, but the motor 16a cannot rotate due to the stuck state, so that overcurrent flows through the motor. Taking this into consideration, in the present disclosure, the change in the output of the position sensor 16c, and the change in the output of the current sensor 16e and the change time are used as a reference for the diagnosis of sticking.

The motor operation mode selected by the motor operation mode-setting section 144 may be divided into a free-rotation mode, a reverse rotation mode, and a target duty increase mode. The free-rotation mode is an operation mode for securing the time and distance to obtain a torque required to repair the motor sticking, and the reverse rotation mode is an operation mode for reversely driving the motor 16a to secure the time and distance to obtain a torque required to repair the motor sticking.

In the free-rotation mode, the motor 16a can rotate freely by temporarily blocking the current being applied to the motor 16a at the time of the diagnosis of the sticking. In addition, when it is impossible to secure the time and distance to obtain a required torque according to the sticking position through the free-rotation mode, the reverse rotation mode is performed such that the motor 16a is rotated opposite to the direction of the target position to secure the aforementioned time and distance.

In addition, in the target duty increase mode, a target duty (motor control value) is gradually (or stepwise) increased in proportion to the re-attempt times of the free-rotation mode or the reverse rotation mode for repairing the sticking.

For example, when the motor sticking is diagnosed with an initial duty of 40% during motor driving, after switching to the free-rotation mode or reverse rotation mode, a first sticking repair attempt is made by increasing the duty of the motor to 60% (motor torque increase) and re-rotating the motor in the direction of the target position, and when the motor sticking is not yet repaired, a second sticking repair attempt is made by additionally increasing the duty of the motor to 80%.

This will be described later in more detail with reference to FIGS. 3A and 3B.

Preferably, in the motor operation mode-setting section 144 preferably, when the motor sticking is diagnosed, the sticking position is recognized from a signal from the position sensor 16c at the time when the sticking is diagnosed, and at the same time, the operation mode first switches to the free-rotation mode. Then, depending on whether the position of the motor 16a is changed after switching to the free-rotation mode, a repair strategy is selected such that the operation mode switches directly to the target duty increase mode or the operation mode switches to the target duty increase mode via the reverse rotation mode.

More preferably, when there is no change in the motor position after switching to the free-rotation mode, a repair strategy of switching to the target duty increase mode via the reverse rotation mode (hereinafter referred to as a 'first repair strategy') may be selected, and when a change is detected in the position of the motor 16a after switching to the free-rotation mode, a repair strategy (hereinafter, referred to as a 'second repair strategy') of switching directly to the target duty increase mode may be selected.

The positioning surface 150 of the detent plate 15 is formed in a curved waveform in which a plurality of mountains and valleys are alternately continuous as described above. In such a structure, there are mainly two types of sticking situations. One is the sticking occurring while the aforementioned roller 15c moves from the mountain (convex portion) to the valley (concave portion), and conversely, another is the sticking occurring while the roller 15c moves from the valley (concave portion) to the mountain (convex portion).

In the type of sticking that occurs while the roller 15c moves from the valley (concave portion) to the mountain (convex portion), when the motor switches to the free-rotation mode, the motor 16a rotates in the opposite direction due to a repulsive force of the detent spring 15b. Accordingly, the roller 15c retracts to an inflection point of the valley (concave portion) that has already passed, thereby securing the time and distance for obtaining a torque required to repair the motor sticking.

Conversely, in the type of sticking that occurs while the roller 15c moves from the mountain (convex portion) to the valley (concave portion), the rotation position of the motor does not change even if the motor 16a switches to the free-rotation mode. Therefore, it is impossible to secure the time and distance to obtain a torque required to repair the motor sticking, unlike the sticking type that occurs while the roller 15c moves from the valley (concave portion) to the mountain (convex portion).

Therefore, different sticking repair strategies are required depending on the type of motor sticking (whether the roller 15c is stuck during movement from the valley (concave portion) to the mountain (convex portion), or conversely, during movement from the mountain (convex portion) to the valley (concave portion). In preferred aspects, either a first repair strategy or a second repair strategy is selectively applied depending on whether or not the position of the motor 16a detected by the position sensor 16c changes after the operation mode switches to the free-rotation mode.

Figure 3A:
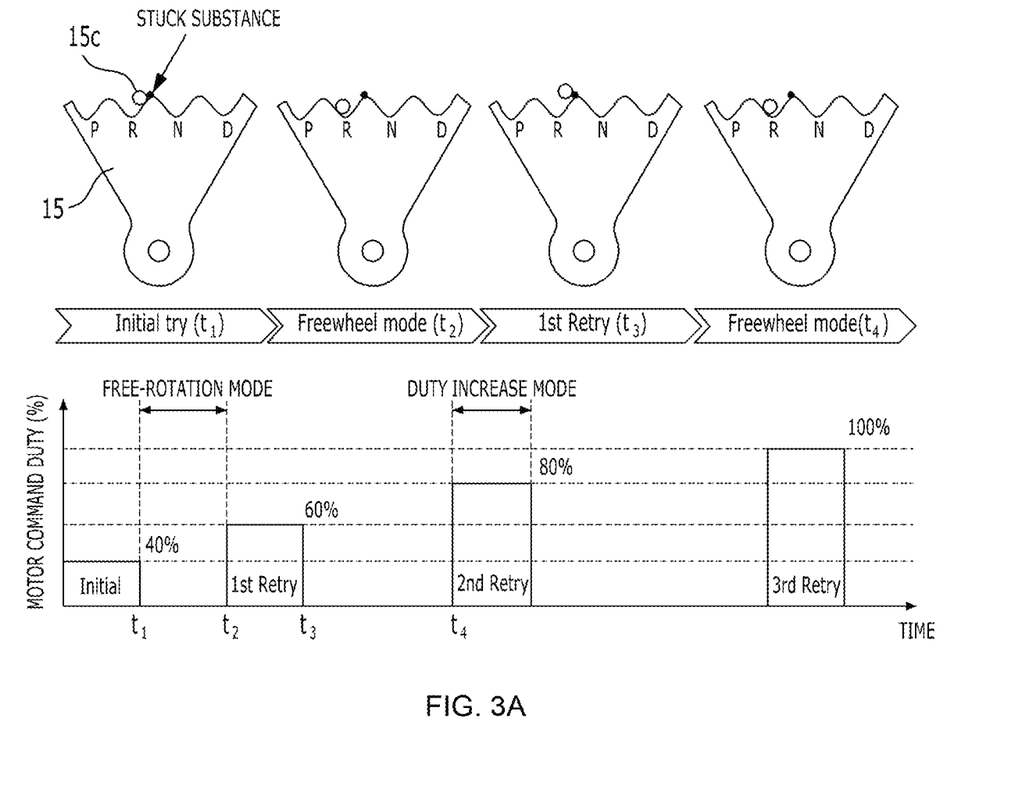
FIGS. 3A and 3B are exemplary operation diagrams illustrating sticking repair strategies selected differently according to a sticking position of a motor.
Figure 3B:
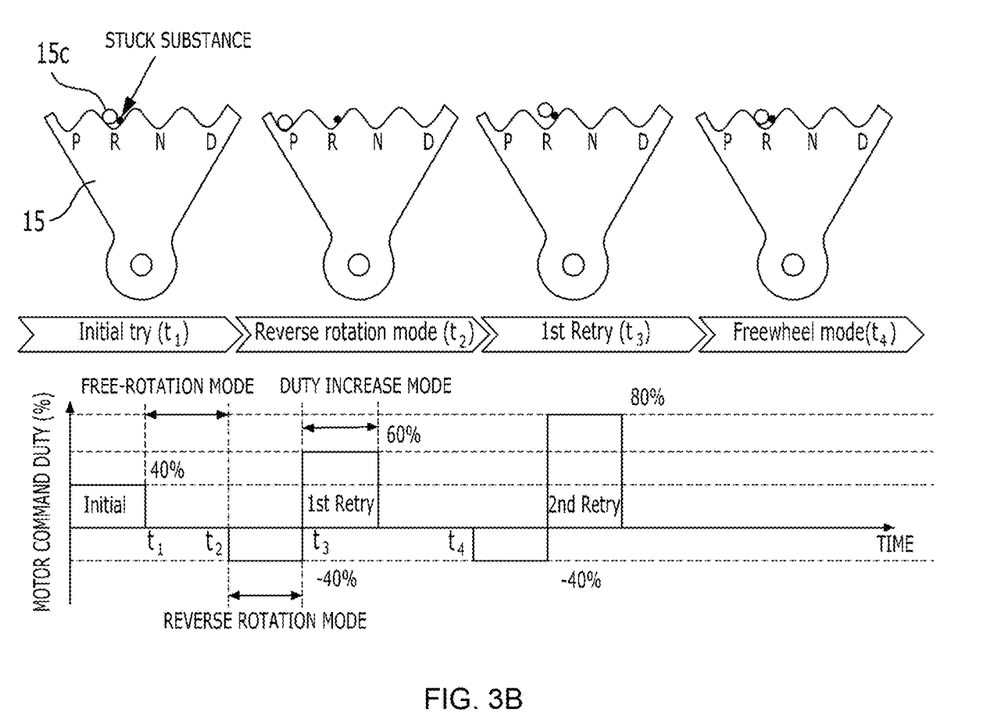

FIGS. 3A and 3B are exemplary operation diagrams illustrating sticking repair strategies selected differently according to the sticking position of the motor. The sticking repair strategies according to the aforementioned sticking types will now be described in detail with reference to FIGS. 3A and 3B.

FIG. 3A illustrates a process of repairing the sticking state of the roller 15c of the detent spring 15b detected during the movement from a valley to a mountain when the roller 15c moves to the target position for changing the shift range. Here, the sticking repair process in which the sticking is detected during the movement from the valley to the mountain consists of three steps.

Referring to FIG. 3A first, step ① represents a situation in which a sticking failure is detected at $t_1$ after an initial attempt with a target duty of 40% for access to a target shift range. Step ② is the step of performing a free-rotation mode, which is a process that after the sticking failure is detected, secures a torque to repair the sticking failure. In the step ②, the detent plate 15 and the motor 16a synchronized with each other rotate in opposite directions due to a repulsive force of the detent spring 15b.

In other words, from the viewpoint of the detent plate 15, upon entering the free-rotation mode, the roller 15c of the detent spring 15b moves in the opposite direction to the target position direction due to a repulsive force of the detent spring 15b. This free-rotation mode ends at a time point $t_2$, which means a time point at which the roller 15c of the detent spring 15b is positioned at the apex of a specific shift range (illustrated as a reverse range R in the drawing) by a repulsive force of the detent spring 15b.

Step ③ is the step of performing a duty increase mode. In step ③, an attempt is made to repair the sticking by applying a duty value higher than the target duty at the previous attempt to the motor immediately after the free-rotation mode ends at $t_2$. In step ③, $t_3$ means the end of the duty increase mode, indicating the time point at which the current motor position reaches a sticking point.

At the time point $t_3$, as will be described later, whether or not the sticking has been repaired is checked. As a result, when it is determined that the sticking has not been repaired, as illustrated in the drawing, the time and distance are secured once again to obtain sufficient torque through the free-rotation mode until $t_4$, and a re-attempt is made with a higher duty. If, as a result of checking the sticking state at $t_3$, the sticking has been repaired, a control operation is performed to accomplish the target position.

FIG. 3B illustrates a process of repairing the sticking state of the roller 15c of the detent spring 15b detected during the movement from a mountain to a valley when the roller 15c moves to the target position for changing the shift range. Here, the sticking repair process in which the sticking is detected during the movement from the valley to the mountain consists of four steps, because a reverse rotation mode is added.

Referring to FIG. 3B, step ① is the same as the previous situation in which the sticking is detected during the movement a valley to a mountain. Step ② is the step of performing a free-rotation mode, which is a process that, after the sticking failure is detected, secures a torque to repair the sticking failure. In step ②, the detent plate 15 and the motor do not rotate even with a repulsive force of the detent spring 15b, unlike the above case of movement from the mountain to the valley.

In other words, from the viewpoint of the detent plate 15, even upon entering the free-rotation mode, there is no change in the position of the roller 15c of the detent spring 15b. Therefore, when there is no change in the position of the motor 16a at the time $t_2$ when the free-rotation mode ends, it is recognized that the sticking is detected during the movement from a mountain to a valley, and a different strategy from the above case in which the sticking is detected during the movement from the valley to the mountain, specifically, a reverse rotation mode, which is the step ③, is performed.

In step ③, a preset reverse duty value is applied to the motor 16a so that the roller 15c of the detent spring 15b is positioned at the apex of a specific shift range (illustrated as a parking range P in the drawing) adjacent to the point where the sticking is diagnosed, and the process ends (time point $t_3$). Immediately after the reverse rotation mode ends, the duty increase mode is maintained until $t_4$ (step ④). Here, $t_4$ is a time point at which the motor reaches the sticking point.

At the time point $t_4$, as in the former operational example, whether or not the sticking has been repaired is checked. As a result, when it is determined that the sticking has not been repaired, as illustrated in the drawing, the time and distance are secured once again to obtain sufficient torque through the reverse rotation mode, and a re-attempt is made with a higher duty. If, as a result of checking the sticking state at $t_4$, the sticking has been repaired, similarly, a control operation is performed to accomplish the target position.

On the other hand, in the aforementioned determination of the sticking repair, an algorithm may be applied to determine the motor sticking repair through the comparison of a distance between the current position of the motor 16*a* and the recorded motor position at the time of the diagnosis of the sticking with respect to the target position on the basis of the output of the position sensor 16*c*.

More specifically, when the absolute value of the difference between the target position and the current position is smaller than the absolute value of the difference between the target position and the sticking position (the position of the motor at the time when the sticking is diagnosed), (|target position−current position|<|Target position−Sticking position|), it is possible to determine that the motor sticking is repaired. This is because when the sticking is repaired, from that moment, the distance to the target position from the current position is reduced.

Hereinafter, a motor sticking diagnosis and repair method performed by the aforementioned motor sticking diagnosis and repair device in the Shift-By-Wire system according to the embodiment of the present disclosure will be described with reference to FIG. 4. For convenience of explanation, the aforementioned configuration illustrated in FIGS. 1 and 2 will be described with reference to the corresponding reference numerals.

Figure 4:
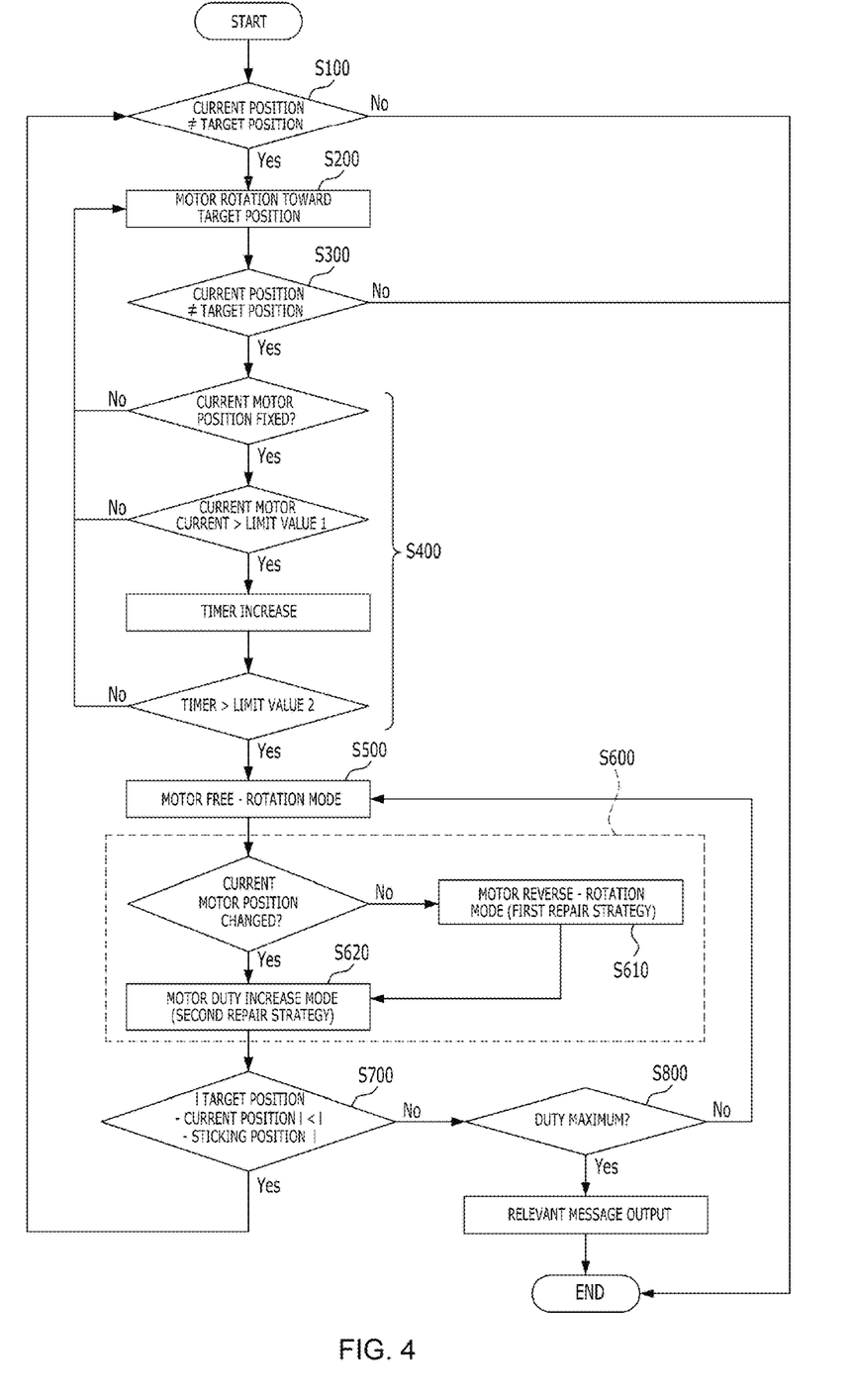
FIG. 4 is a flowchart illustrating a motor sticking diagnosis and repair method in a SBW system according to an embodiment of the present disclosure.

FIG. 4 is a flowchart illustrating a motor sticking diagnosis and repair method in a SBW system according to an embodiment of the present disclosure.

Referring to FIG. 4, the motor sticking diagnosis and repair method starts from step S100 of determining whether or not a current position of a motor 16*a* matches a target position when manipulation of a shift lever is detected. When the shift lever 11 is manipulated, a change in physical position is converted into an electric signal to generate a difference between the current position and the target position. In the present disclosure, it is determined whether or not the current position and the target position match each other, using this difference.

As a result of the determination of step S100, when the current position and the target position do not match, it is determined that the range change to a target shift range selected by the shift lever manipulation is not made, and step S200 of rotating a motor in the target position direction is performed, and when the current position and the target position match each other, it is determined that the change of the shift range intended by a driver has been normally performed, and the control is terminated.

After the motor rotates in step S200, it is determined once again whether the current position and the target position match each other (S300). As a result of step S300, when the current position and the target position match each other, it is determined that the change of the shift range intended by a driver has been normally performed, and the control is terminated, and when the current position and the target position do not match each other, the process proceeds to step S400 of diagnosing whether or not the motor is stuck.

Preferably, in step S400, when there is no change in the output of a position sensor 16*c* that detects the rotation direction and the rotation angle of the motor 16*a*, it is possible to diagnose that the motor has been stuck. More preferably, when there is no change in the output of the position sensor 16*c* that detects the rotation direction and the rotation angle of the motor 16*a*, and the output of the current sensor 16*e* that detects the intensity of the current applied to the motor 16*a* exceeds a set limit value for a preset time, it is possible to diagnose that the motor sticking has occurred.

When the motor sticking occurs in a state in which the motor 16*a* does not reach the target position, the current to rotate the motor 16*a* to the target position is continuously applied, but the motor 16*a* cannot rotate due to the stuck state, so that overcurrent flows through the motor. Taking this into consideration, in the present disclosure, the change in the output of the position sensor 16*c*, and the change in the output of the current sensor 16*e* and the change time are used as a reference for the diagnosis of sticking.

In step S400, when the above-mentioned sticking diagnosis condition (there is no change in the output of the position sensor 16*c*, and the output of the current sensor 16*e* that detects the strength of the current applied to the motor exceeds the set limit value for the preset time) is not met, the process returns to step S200, and when the condition is met so that the motor sticking is diagnosed, the location at the time of diagnosing sticking is stored as the stuck position and then the operation mode switches to a free-rotation mode (S500).

In step S500, the motor 16*a* can rotate freely by temporarily blocking the current being applied to the motor at the time of diagnosing the motor sticking. In the motor free-rotation mode, depending on the position where the motor 16*a* is stuck, more specifically, the position of the roller 15*c* of the detent spring 15*b* on the positioning surface 150 of the detent plate 15, the motor may or may not rotate.

As described before, this is because in the type of sticking that occurs while the roller 15*c* moves from the valley (concave portion) to the mountain (convex portion) of the positioning surface 150, when the motor switches to the free-rotation mode, the motor 16*a* rotates in the opposite direction due to a repulsive force of the detent spring 15*b*, whereas in the type of sticking that occurs while the roller 15*c* moves from the mountain (convex portion) to the valley (concave portion), the motor 16*a* does not rotate even when the operation mode switches to the free-rotation mode.

Therefore, in sticking repair step S600 performed after step S500, in order to repair the sticking, either a first repair strategy or a second repair strategy is selected according to whether or not the position of the motor 16*a* is changed (rotation state) after switching to the free-rotation mode. Preferably, in step S600, when there is no change in the motor position after switching to the free-rotation mode, the first repair strategy S610 is selected, and when a change in the motor position is detected, the second repair strategy S620 is selected.

The first repair strategy means a strategy that in a state in which the motor 16*a* is driven in the opposite direction (reverse drive) so as to be positioned in the valley of the adjacent shift range, a duty is increased by a set increment and the motor 16*a* is driven in the direction of the target position with the increased duty to repair the sticking. This is a strategy to secure the time and distance to obtain a torque required to repair the motor sticking through reverse driving.

In addition, the second repair strategy means a strategy in which after the duty is increased by a set increment and the motor 16*a* is driven in the direction of the target position with the increased duty value to repair the sticking. Here, in the type of sticking that occurs during the movement from a valley (concave portion) to a mountain (convex portion), it is possible to secure the time and distance to obtain a torque required to repair the motor sticking only by free rotation of the motor.

After performing the motor sticking repair strategy through step S600, it is determined whether or not the motor sticking has been repaired through the first repair strategy or the second repair strategy (S700). As a result of the determination in step S700, when it is determined that the motor sticking has been repaired, the process returns to step S100, and when it is determined that the motor stickiness has not been repaired, the process proceeds to step S800 of checking the duty value.

In step S800, the duty value applied last to the motor is compared with a maximum set value, and when the comparison result is less than the maximum set value, the process returns to step S500 and repeats the subsequent steps such that the duty is further increased by a set increment and then the first repair strategy or the second repair strategy is applied again with the increased duty. Here, the maximum set value may be 100% duty, but may be set lower than this for safety considerations.

In step S700, it is possible to determine whether or not the sticking has been repaired by comparing the distance between the current motor position and the motor position at the time of diagnosing the sticking on the basis of the target position. More specifically, when the absolute value of the difference between the target position and the current position is smaller than the absolute value of the difference between the target position and the sticking position (|target position−current position|<|Target position−Sticking position|), it is possible to determine that the motor sticking has been repaired.

This is because when the sticking has been repaired, from that moment, the distance to the target position from the current position is reduced.

On the other hand, when the duty value reaches the maximum set value as a result of checking through step S800, it is determined that the motor sticking cannot be repaired, and a related warning message can be output through a driver recognizable means.

For example, in the case where the maximum set value is 100% duty, when the motor sticking has not been repaired even with 100% duty in step S620, it is recognized that the motor sticking cannot be repaired by duty control alone and a related warning message may be output through an appropriate driver-recognizable means (e.g., a cluster or AVN) so that a quick follow-up can be made.

According to the embodiments of the present disclosure discussed above, by applying the free-rotation mode, it is possible to accurately determine the type of sticking (whether motor sticking occurred during movement from valley to mountain direction or movement from mountain to valley direction with reference to a position of a roller on a positioning surface of a detent plate), and selectively apply an appropriate strategy depending on the sticking type.

In other words, there is an advantage in that the sticking can be repaired by the sticking repair strategy through an efficient motor movement, and the duty value is gradually increased in proportion to the attempt times to repair the sticking, so when the degree of sticking is not severe, the sticking problem can be solved even in a low duty region before the maximum duty (100%) is applied, and thus unnecessary power consumption in the process of repairing the sticking can be reduced.

In the above detailed description of the present disclosure, only specific embodiments thereof have been described. However, it is to be understood that the present disclosure is not limited to the particular form recited in the detailed description, but rather, it is to be understood to cover all modifications and equivalents and substitutions falling within the spirit and scope of the present disclosure as defined by the appended claims.

The invention claimed is:

1. A method of diagnosing and repairing motor sticking in a Shift-By-Wire (SBW) system in which a shift range change of an automatic transmission is implemented by a motor, the method comprising:
   (a) when an operation of a shift lever is detected, determining whether or not a current position of the motor matches a target position;
   (b) when the current position does not match the target position, rotating the motor in a direction of the target position;
   (c) determining once again whether or not the current position of the motor matches the target position after rotation of the motor;
   (d) when it is determined that the current position does not match the target position, diagnosing whether or not the motor sticking has occurred;
   (e) when the motor is diagnosed as being stuck, allowing the motor to switch to a free-rotation mode in which the motor is freely rotatable by temporarily blocking a current being applied to the motor at the time of diagnosis; and
   (f) selecting either a first repair strategy or a second repair strategy depending on whether or not the position of the motor changes after switching to the free-rotation mode to repair the motor sticking.

2. The method according to claim 1, wherein as a result of the determination through steps (a) and (c), when the current position and the target position match each other, it is recognized that the shift range has been changed normally, and the method is terminated in the corresponding step without further progress.

3. The method according to claim 1, wherein in step (d), when there is no change in an output of a position sensor for detecting the rotation direction and rotation angle of the motor, it is possible to diagnose the motor as being stuck.

4. The method according to claim 1, wherein in step (d), when there is no change in an output of a position sensor for detecting the rotation direction and rotation angle of the motor, and an output of a current sensor for detecting a strength of the current applied to the motor exceeds a predetermined limit value for a predetermined time, it is possible to diagnose the motor as being stuck.

5. The method according to claim 1, wherein in step (f), when there is no change in the motor position after switching to the free-rotation mode, the first repair strategy is selected, and when a change in the motor position is detected after switching to the free-rotation mode, the second repair strategy is selected.

6. The method according to claim 5, wherein the first repair strategy is a strategy that firstly drives the motor opposite to the direction of the target position to position the motor in a valley portion of an adjacent shift ranges, and after adjusting a duty value to increase by a predetermined increment, secondly drives the motor in the direction of the target position with the increased duty value to repair the motor sticking, and the second repair strategy is a strategy that after adjusting a duty value to increase by a predetermined increment, drives the motor in the direction of the target position with the increased duty value to repair the motor sticking.

7. The method according to claim 6, further comprising:
(g) determining whether or not the motor sticking has been repaired through the first or second repair strategy; and
(h) as a result of the determination through step (g), when the motor sticking is not repaired, checking the duty value, wherein as a result of checking through step (h), when the duty value is less than a predetermined maximum value, the method return to step (e), and the subsequent steps repeat such that after the duty value is further increased by the predetermined increment, the first repair strategy or the second repair strategy is applied again.

8. The method according to claim 7, wherein in step (g), it is possible to determine whether or not the motor sticking has been repaired by comparing a distance between the current motor position and the motor position at the time when the sticking is diagnosed on the basis of the target position.

9. The method according to claim 7, wherein as a result of checking through step (h), when the duty value reaches the predetermined maximum value, it is determined as a situation in which the motor sticking cannot be repaired, and a relevant warning message is output through a driver recognizable means.

10. A device for diagnosing and repairing motor sticking in a Shift-By-Wire (SBW) system in which a shift range change of an automatic transmission is implemented by a motor, the device comprising:
a motor generating a driving force for rotating a detent plate to a target position of the detent plate;
a Hall sensor and a current sensor provided to specify a position of a rotor inside of the motor and an intensity of a current applied to the motor, respectively;
a position sensor provided to detect a signal change according to the rotation of the motor and output a PWM signal corresponding to a current shift range; and
a Shift-By-Wire (SBW) controller configured to analyze a signal from a shift lever sensor detecting a change in a position of a shift lever to set the target position of the detent plate, and control the driving of the motor on the basis of signals of the Hall sensor and the position sensor to rotate the detent plate toward the set target position of the detent plate,
wherein the SBW controller is configured to diagnose whether or not the motor sticking has occurred from the signals of the position sensor and the current sensor, and when the motor sticking is diagnosed, to apply different repair strategies depending on a position of the motor being stuck to repair the motor sticking.

11. The device according to claim 10, wherein the SBW controller comprises:
a data collection section operated to receive signals from the shift lever sensor and the position sensor, and determine whether or not the current position of the motor matches the target position of the motor on the basis of the received signals;
a motor sticking-determination section operated to receive signals from the current sensor and the position sensor and diagnose whether or not the motor sticking has occurred on the basis of the received signals;
a motor operation mode-setting section operated to, when the motor is diagnosed in the motor sticking-determination section as being stuck, select different control modes depending on a position of the motor being stuck to repair the motor sticking; and
a duty application section operated to apply a duty set depending on the control mode selected by the motor operation mode-setting section to the motor.

12. The device according to claim 11, wherein when there is no change in the output of the position sensor for detecting the rotation direction and rotation angle of the motor, the motor sticking-determination section diagnoses the motor as being stuck.

13. The device according to claim 11, wherein when there is no change in the output of the position sensor for detecting the rotation direction and rotation angle of the motor, and the output of the current sensor for detecting the strength of the current applied to the motor exceeds a predetermined limit value for a predetermined time, the motor sticking-determination section diagnoses the motor as being stuck.

14. The device according to claim 11, wherein the motor operation mode selected by the motor operation mode-setting section comprises:
a free-rotation mode that secures a time and a distance to obtain a torque required to repair the motor sticking;
a reverse rotation mode that when it is impossible to secure the time and distance to obtain the required torque through the free-rotation mode depending on the position of the motor being stuck, drives the motor in the reverse direction (the opposite direction to the target position direction) to secure the time and distance; and
a target duty increase mode that gradually increases a target duty in proportion to the re-attempt times of the free-rotation mode or the reverse rotation mode.

15. The device according to claim 14, wherein the motor operation mode-setting section selects a repair strategy that switches to the free-rotation mode so that the motor is freely rotatable by temporarily blocking the current being applied to the motor at the time of diagnosis of the sticking, and depending on whether or not the motor position changes after switching to the free-rotation mode, switches directly to the target duty increase mode or switches to the target duty increase mode via the reverse rotation mode.

16. The device according to claim 15, wherein when there is no change in the motor position after switching to the free-rotation mode, a repair strategy of switching to the target duty increase mode via the reverse rotation mode is selected, and when there is a change in the motor position after switching to the free-rotation mode, a repair strategy of switching directly to the target duty increase mode is selected.

17. The device according to claim 10, wherein the SBW controller determines whether or not the motor sticking has been repaired by comparing a distance between the current motor position and the motor position at the time when the sticking is diagnosed with respect to the target position on the basis of the output of the position sensor.

* * * * *